United States Patent [19]

Orii et al.

[11] Patent Number: 4,683,128

[45] Date of Patent: Jul. 28, 1987

[54] PROCESS FOR MANUFACTURING HIGH PURITY SILICA

[75] Inventors: Koichi Orii, Yokohama; Masashi Nishida, Hachinohe; Junsuke Yagi; Iwao Ohshima, both of Yokohama, all of Japan

[73] Assignees: Nitto Chemical Industry Co., Ltd.; Mitsubishi Rayon Co., Ltd., both of Tokyo, Japan

[21] Appl. No.: 878,773

[22] Filed: Jun. 25, 1986

[30] Foreign Application Priority Data

Jun. 27, 1985 [JP] Japan .................. 60-139145
Jun. 27, 1985 [JP] Japan .................. 60-139146
Feb. 5, 1986 [JP] Japan .................. 61-22068
Feb. 5, 1986 [JP] Japan .................. 61-22069

[51] Int. Cl.$^4$ ............................................ C01B 33/12
[52] U.S. Cl. ................................ 423/338; 423/335; 423/339; 423/340
[58] Field of Search ............... 423/338, 339, 340, 335

[56] References Cited

U.S. PATENT DOCUMENTS 3,846,537 11/1974 Marotta ................. 423/338
3,857,924 12/1974 Halasz et al. .......... 423/339
3,959,174 5/1976 Winyall et al. ........ 423/338
4,089,932 5/1978 Morita et al. .......... 423/339

FOREIGN PATENT DOCUMENTS 11292476 10/1976 Japan .
5463284 3/1984 Japan .
4221785 3/1985 Japan .
4221885 3/1985 Japan .
18091185 9/1985 Japan .
19101685 9/1985 Japan .
20461285 10/1985 Japan .
20461385 10/1985 Japan .
1741686 1/1986 Japan .

OTHER PUBLICATIONS

Chemical Engineers' Handbook, 5th edition, 1973, Perry, p. 21-5.

Primary Examiner—John Doll
Assistant Examiner—Lori S. Freeman
Attorney, Agent, or Firm—Cushman, Darby & Cushman

[57] ABSTRACT

This invention deals with a process for manufacturing high purity silica which comprises making an aqueous alkali silicate solution into fine fibrous gel in a coagulant, treating the fibrous gel obtained with an acid-containing solution, and then with water to extract and remove impurities; and optionallly heating a resulting silica at a temperature of 1,000° C. or higher. Thus obtained silica is preferably used as a filler, especially, the one for resin compositions for encapsulating electronic parts; etc.

27 Claims, No Drawings

PROCESS FOR MANUFACTURING HIGH PURITY SILICA

BACKGROUND OF THE INVENTION

FIELD OF THE INVENTION

This invention relates to a process for manufacturing high purity silica. Particularly, it relates to a process for manufacturing high purity silica having a very low content of impurities such as alkali metals, chlorine and radioactive impurities such as uranium from an aqueous alkali silicate solution.

High purity silica is used as a filler, dispersant and the like and as a material for transparent vitreous silica, special ceramics and the like, and is expected to be used as a material for filler for resin compositions for encapsulating electronic parts.

As materials for encapsulating electronic parts, there are used synthetic resin compositions containing an inorganic filler such as silica. It is considered to be advantageous to incorporate inorganic fillers as much as the moldability permits from the viewpoint of physical properties such as expansion coefficient, thermal conductivity, moisture permeability and mechanical properties and cost, and silica type fillers are considered to be most preferable. However, with an enhancement of the degree of integration of elements of electronic parts, there is caused a problem of erroneous working of elements, which seems to be attributable to $\alpha$-rays emitted from slight amounts of radioactive elements such as uranium, thorium and the like contained in encapsulating materials used, particularly silica type fillers, in an amount of tens to hundreds ppb. It is desired to further reduce the content of such impurities in silica.

The process of this invention aims at meeting this desire.

DESCRIPTION OF THE PRIOR ART

As processes for manufacturing high purity silica, the following processes are known:

(1) a process which comprises reacting, in oxyhydrogen flame, silicon tetrachloride purified by distillation, adsorption, liquid-phase extraction and the like, and (2) a process which comprises manufacturing high purity silica by using an aqueous alkali silicate solution as a starting material.

As the latter process, there have been proposed the following processes:

(2-1) a process which comprises purifying silica by treating an aqueous alkali silicate solution with an ion-exchange resin (Japanese patent application Kokai (Laid-Open) Nos. 42217/85 and 42218/85, etc.), and (2-2) a process which comprises purifying silica by treating an aqueous alkali silicate solution with an acid (Japanese patent application Kokai (Laid-Open) Nos. 54632/84, 191016/85 and 204612/85, etc.).

Finely granulated silica of high purity can be manufactured by these processes, but in the case of the process of (1), the resulting silica particles are fine particles having an average particle size of the order of m$\mu$, have a large specific surface area, and are difficult to utilize as a filler for resin compositions for encapsulating electronic parts.

The process of (2-1) is insufficient in efficiency of apparatus because the procedure of purification treatment is always carried out after lowering the SiO$_2$ concentration of the aqueous alkali silicate solution to about 10% by weight or less. It is insufficient also in productivity because the operation conditions of precipitating silica from a silica sol and separating and recovering the same from a mother liquor are complicated.

The process of (2-2) is simple and variously tried, but extraction of the impurities is difficult because phase separation is locally caused even when the aqueous alkali silicate solution is treated with a concentrated acid. Further, even when the aqueous alkali silicate solution is extruded into a dilute acid solution in order to avoid the local phase separation, the alkali silicate fractions extruded adhere to one another to form large masses, so that the extraction rate of impurities is greatly lowered.

Therefore, these processes are insufficient to practical use.

SUMMARY OF THE INVENTION

The present inventors have devoted themselves to research in order to remove these problems in the conventional processes and manufacture high purity silica having a very low content of impurities efficiently and economically by using an aqueous alkali silicate solution as a starting material, and have accomplished this invention.

An object of this invention is to provide a process for manufacturing high purity silica by a relatively simple procedure by using an inexpensive aqueous alkali silicate solution as a starting material.

A further object of this invention is to provide a process for manufacturing high purity silica having low hygroscopicity, high bulk density and small specific surface area.

DESCRIPTION OF THE PREFERRED EMBODIMENTS

The method of this invention is a process for manufacturing high purity silica which comprises making an aqueous alkali silicate solution into fine fibrous gel in a coagulant, treating the fibrous gel obtained with an acid-containing solution, and then with water to extract and remove impurities therefrom.

This invention includes four aspects: that is, a process wherein said coagulant is a water-soluble organic medium (hereinafter referred to as Process A-1); the same process as Process A-1 except for use of an acid solution as the coagulant instead of a water-soluble organic medium (hereinafter referred to as Process B-1); and processes which comprise heat-treating the silica obtained by Process A-1 or Process B-1 at a temperature of 1,000° C. or higher, and thereby lowering the hygroscopicity and obtaining a dense silica having a small specific surface area (hereinafter referred to as Process A-2 and Process B-2, respectively) (Process A-1 and Process A-2 being generically named Process A, and Process B-1 and Process B-2 being generically named Process B).

The gists of the individual processes are as follows.

Process A-1: a process for manufacturing high purity silica which comprises;

(1) a step of extruding an aqueous solution of an alkali silicate shown by the general formula M$_2$O.nSiO$_2$ wherein M is an alkali metal element and n is a number of moles of SiO$_2$ of 0.5 to 5, and having a viscosity in the range of 2 to 500 poise into a water-soluble organic medium through a spinning nozzle having a bore diameter of 1 mm or less to coagulate the same, and thereby making the same into a fibrous gel, and (2) a step of treating the fibrous gel obtained with an acid-containing solution, then washing the gel with water to extract and remove impurities, and thereby obtaining silica.

Process A-2: a process for manufacturing high purity silica which comprises;

(1) a step of extruding an aqueous solution of an alkali silicate shown by the general formula $M_2O \cdot nSiO_2$ wherein M is an alkali metal element and n is a number of moles of $SiO_2$ of 0.5 to 5, and having a viscosity in the range of 2 to 500 poise into a water-soluble organic medium through a spinning nozzle having a bore diameter of 1 mm or less to coagulate the same, and thereby making the same into a fibrous gel, (2) a step of treating the fibrous gel obtained with an acid-containing solution, then washing the gel with water to extract and remove impurities, and thereby obtaining silica, and (3) a step of heat-treating the silica obtained, at a temperature of 1,000° C. or higher.

Process B-1: a process for manufacturing high purity silica which comprises;

(1) a step of extruding an aqueous solution of an alkali silicate shown by the general formula $M_2O \cdot nSiO_2$ wherein M is an alkali metal element and n is a number of moles of $SiO_2$ of 0.5 to 5, and having a viscosity in the range of 2 to 500 poise into an acid solution having an acid concentration of 4N or less through a spinning nozzle having a bore diameter of 1 mm or less to coagulate the same, and thereby making the same into a fibrous gel, and (2) a step of treating the fibrous gel obtained with an acid-containing solution, then washing the gel with water to extract and remove impurities, and thereby obtaining silica.

Process B-2: a process for manufacturing high purity silica which comprises:

(1) a step of extruding an aqueous solution of an alkali silicate shown by the general formula $M_2O \cdot nSiO_2$ wherein M is an alkali metal element and n is a number of moles of $SiO_2$ of 0.5 to 5, and having a viscosity in the range of 2 to 500 poise into an acid solution having an acid concentration of 4N or less through a spinning nozzle having a bore diameter of 1 mm or less to coagulate the same, and thereby making the same into a fibrous gel, and (2) a step of treating the fibrous gel obtained with an acid-containing solution, then washing the gel with water to extract and remove impurities, and thereby obtaining silica, and (3) a step of heat-treating the silica obtained, at a temperature of 1,000° C. or higher.

This invention is explained below in detail.

Embodiments of Process A-1 or Process B-1 comprise the following two steps:

Step 1: Fiberization step

A high-viscosity solution having stringiness (hereinafter referred to as starting solution) was prepared from an aqueous alkali silicate solution, and this starting solution is made into a fine fibrous gel by coagulating the same in a coagulant by means of a fiberizing apparatus.

Step 2: Impurities-extracting step

Impurities are extracted and removed from the fibrous gel obtained by treatment with an acid-containing solution (hereinafter referred to as treating solution) and then with water.

The characteristics in the Step 1 of Process A and Process B of this inventions are as follows.

(1) An aqueous alkali silica solution is made into a fine fibrous gel by coagulating the same in a coagulant by means of a fiberizing apparatus equipped with a spinning nozzle having a bore diameter of 1 mm or less (hereinafter referred to as nozzle). The fibrous gel thus obtained has a very small diameter and a high surface area, so that the efficiency of extraction of impurities is raised.

(2) In making an aqueous alkali silicate solution into a fine fibrous gel, said solution having a viscosity in the range of 2–500 poise is used:

in Process A, an aqueous alkali silicate solution having a viscosity in the range of 2 to 500 poise is coagulated in a water-soluble organic medium, and in Process B, an aqueous alkali silicate solution having a viscosity in the range of 2 to 500 poise, preferably 2 to 200 poise is coagulated in an acid solution having an acid concentration of 4N or less.

Surprisingly, a fibrous gel having a hollow structure can be obtained even by means of a conventional nozzle having circular bores by combining the above-mentioned characteristics (1) and (2) in the Step 1. This coagulated product retains a homogeneous, highly swollen state, and has a structure which permits easy extraction of impurities with acid and water. Therefore, in cooperation with the effect of the above-mentioned characteristic (1), the combination described above can greatly improve the efficiency of extraction of impurities in silica in the Step 2.

In the process of this invention, as the aqueous alkali silicate solution, i.e., the starting material, there can be used aqueous solutions of sodium salt, potassium salt, lithium salt or the like of silicic acid.

The above mentioned two steps are successively explained below by taking the case where an aqueous sodium silicate solution is used as the aqueous alkali silicate solution in the process of this invention.

Step 1: Fiberization step

An aqueous sodium silicate solution as a starting material is prepared so as to have a viscosity in a range suitable for fiberizing the solution. Thus, a starting solution is obtained.

The viscosity range of a starting solution suitable for Process A is suitably 2 to 500 poise, particularly 10 to 200 poise, and the viscosity range of a starting solution suitable for Process B is 2 to 500 poise, suitably 2 to 200 poise, particularly 10 to 100 poise.

When an aqueous sodium silicate solution having a high $SiO_2$ concentration and too high a viscosity is used as a starting material, it is used after proper dilution with water.

An aqueous sodium silicate solution containing about 30% $SiO_2$ have a low viscosity and an insufficient stringiness in a usual state, and hence is used after polymerizing its sodium silicate in order to impart sufficient stringiness to the solution.

As methods for polymerizing sodium silicate, there have been proposed a partial neutralization method using an acidic substance, a dehydrating-concentration method, a method comprising addition of a polyvalent metal salt, etc. Among these methods, the dehydrating-concentration method is the simplest, and several percents dehydration causes polymerization of sodium silicate and hence an increase of the viscosity.

The starting solution prepared is maintained at a temperature suitable for fiberization, for example, 30° to 60° C., and fed to a fiberizing apparatus through an appropriate filter by means of a constant feed pump.

The fiberizing apparatus is not critical, and in general, an extruder equipped with a spinning nozzle can be used.

The most serious problem in employment of a nozzle is occurrence of a trouble of adhesion of the starting solution extruded through the nozzle to the surface of outlet of the nozzle.

As is generally known, an aqueous sodium silicate solution is a viscous solution having a high affinity for metals, and is rapidly coagulated by a slight decrease of its water content. As can be seen from the fact that this solution is used also as an adhesive, when the starting solution comprising an aqueous sodium silicate solution is coagulated while adhering to the nozzle surface, a strong bonding is formed between sodium silicate and the nozzle surface, and it is very difficult to peel them off from each other. When the coagulated product adheres to the nozzle surface, the starting solution extruded through adjacent bores adheres thereto successively, and finally continuance of fiberization operation becomes impossible.

Such a phenomenon tends to occur when the nozzle used has a small bore diameter and a large number of bores. A solution for this problem is to reduce the adhesive tendency between the nozzle surface and the starting solution as much as possible.

The present inventors have conducted various researches on materials for the nozzle used, and have consequently found that when there is used a nozzle made of a noble metal alloy such as gold-platinum alloy, or a tetrafluoroethylene (hereinafter referred to as TFE) resin, or a nozzle coated on the nozzle surface with a TFE resin, the separability of a gelatinized alkali silicate from the nozzle is markedly improved.

The TFE resin in this invention denotes polyethylene tetrafluoride (PTFE) and copolymers such as copolymers of TFE and hexafluoropropylene, copolymers of TFE and perfluoroalkylvinyl ether, copolymers of ethylene and TFE, copolymers of ethylene and vinyl fluoride, copolymers of ethylene and vinylidene fluoride, copolymers of ethylene and chlorotrifluoroethylene, and the like.

Coating of a TFE resin on the nozzle surface is conducted by a conventional method and may, if necessary, be conducted after coating the nozzle outer surface with a primer.

For the fiberization, there can be employed, besides wet processes, various processes such as a process comprising once extruding an aqueous alkali silicate solution into air through a nozzle and then coagulating the same by treatment with an acid solution, though the wet processes are more advantageous than the dry processes from the viewpoint of prevention of adhesion of an aqueous alkali silicate to the nozzle surface.

In this invention, the starting solution is extruded through a nozzle immersed in a coagulating bath. The starting solution extruded coagulates in fibrous form and gels. The fibrous gel is taken off by means of a roller, or placed on a belt conveyor and sent to the next step 2.

The bore diameter of the nozzle used in this step is suitably in the range of 0.05 to 1.0 mm, preferably in the range of 0.1 to 0.3 mm.

As the nozzle, a conventional nozzle having circular bores is used, though there can also be used a nozzle having modified cross-section bores and a nozzle for spinning hollow fiber.

According to the process of this invention, a hollow fibrous gel can be obtained without using a nozzle for spinning hollow fiber, and a satisfactory impurities-extracting effect can be obtained in the step 2.

Incorporation of fine bubbles into the fibrous gel is also effective in increasing the efficiency of extraction of impurities. As a method for incorporating fine bubbles into the fibrous gel, there can be employed various methods, for example, a method using a starting solution prepared by stirring so as to cause suction of air into the solution; a method comprising adding to a starting solution a chemical foaming agent which decomposes on heating to produce gas or a low boiling substance which is liquid at ordinary temperature, and then fiberizing said starting solution with heating; and a method utilizing a cavitation phenomenon caused by a pump for feeding the starting solution to a fiberizing apparatus.

As a coagulant used in the coagulating bath in Process A, a water-soluble organic medium is used. Water-soluble organic media have high affinity for water, but almost no affinity for alkali silicates. Coagulation of alkali silicates seems to be caused by the so-called dehydration effect. The water-soluble organic medium used in Process A denotes, for example, alcohols such as methanol, ethanol, n-propanol and the like; esters such as methyl acetate, ethyl acetate and the like; ketones such as acetone, methyl ethyl ketone and the like; amides such as dimethylacetamide (hereinafter referred to as DMAC), dimethylformamide (hereinafter referred to as DMF) and the like; and dimethyl sulfoxide.

As a coagulant used in the coagulating bath in Process B, an acid solution is used. The acid denotes inorganic acids such as sulfuric acid, nitric acid, hydrochloric acid and the like, and it is preferable to use sulfuric acid or nitric acid. As the acid solution, aqueous solutions of these acids are preferable for practical use.

The acid concentration of the acid solution as the coagulant is preferably in the range of 0.1N or more and 4N or less.

When an acid solution having an acid concentration of more than 4N is used as the coagulant, the structure of the resulting silica is too dense, so that it becomes difficult to extract impurities contained in the inner part in the next step 2.

When the acid concentration of an acid solution used as the coagulant is less than 0.1N, the coagulation rate of the alkali silicate is too slow, so that pieces of the resulting fibrous gel tend to adhere to one another. Therefore, such a concentration is not practical.

For these reasons, the acid concentration of an acid solution used as the coagulant is suitably in the range of 0.1 to 4N, preferably 0.5 to 3N, more preferably 1 to 2N.

When the viscosity of the starting solution, the bore size of the nozzle, and a coagulant used as the coagulating bath are combined according to the conditions specified in the specification, the coagulation rate of the alkali silicate is appropriate, and there can be obtained a transparent fibrous gel which has a hollow structure unexpectedly and is in a highly swollen state. The gel thus obtained retains the swollen state also in the next step 2, and undergoes alkali elimination in this state.

The surface of the fibrous gel obtained has numerous scale-like cracks, and the presence of the cracks facilitates penetration of the acid into the gel, so that the efficiency of extraction of impurities is markedly improved by the synergistic effect of the presence of the cracks and the large surface area characteristic of fine fiber having a hollow structure.

Further, the presence of the cracks can greatly reduce the load on a grinding step in adjustment of the particle size of silica.

The term "the highly swollen state of the gel" used in the specification means a state in which the liquid content of the gel is high. The degree of the swelling can be expressed in terms of the liquid content of the gel.

There is a preferable range of the liquid content of gel in a state in which impurities are easily extractable. When the liquid content is calculated by using the following equation:

$$\text{liquid content } (\%) = (w_1 - w_2) \times 100 / w_2$$

$w_1$: the weight (g) of the residue of about 10 g of a sample after removal of a liquid adhering thereto by means of a centrifuge at room temperature (1000 G × 10 min treatment), $w_2$: the weight (g) of the sample after the above-mentioned treatment, followed by drying at 150° C. for 4 hours and allowing to cool to room temperature in a desiccator, a preferable range of the liquid content of the fibrous gel in the case of using, for example, aqueous sodium silicate solution No. 3 as a starting material is about 80 to about 150%.

When the liquid content is less than 80%, it becomes difficult to extract impurities contained in the inner part in the next step 2 probably because the structure of the gel formed is too dense. On the other hand, when the liquid content exceeds 150%, the resulting gel is transparent but the volume shrinkage of the gel is increased in the step 2 probably because the silica concentration in the gel becomes too low, and there is obtained devitrified silica still containing impurities in the inner part. Even when silica in such a state is repeatedly subjected to an extraction procedure of impurities, the removal of impurities aimed at by this invention is difficult.

Even in the case of fibrous gel having a liquid content in the above-mentioned range, the removal of impurities aimed at this invention is difficult if the gel has an uneven silica concentration, is partially whitened, and is devitrified.

Process B is advantageous when there is used as the coagulant a solution of the same acid as that used in the next step 2, because there can be omitted steps of recovery of the coagulant, treatment of waste liquid, and the like which are necessary for Process A using an organic solvent as the coagulant.

In both Process A and Process B of this invention, the coagulation rate of alkali silicate varies greatly depending also on the kind of the coagulant used, and therefore it is difficult to determine the temperature of the coagulating bath unequivocally, though a temperature of about 10° to about 60° C. is usually preferred.

In taking off the fibrous gel, a roller type take-off unit is usually operated at a speed of about 1 to about 100 m per minute and a conveyor type take-off unit at a speed of about 0.1 to about 50 m per minute.

Step 2: Impurities-extracting step

The fibrous gel obtained in the above-mentioned step 1 is treated with an acid-containing solution in this step. The acid denotes inorganic acids such as sulfuric acid, hydrochloric acid, nitric acid and the like and organic acids such as formic acid and the like. It is preferable for practical use to use sulfuric acid, nitric acid or the like.

As the treating solution, aqueous solutions of these acids are preferable for practical use.

As the acid treatment procedure in this step, a method comprising treatment in one stage can be employed, though in order to extract and remove an especially slight amount of impurities, it is also possible to carry out a multistage treatment in which the treatment procedure is divided into at least two stages and a treating solution used is renewed at every stage.

As a method for extracting impurities, a method using a concentrated acid is generally used, but in the process of this invention, it is preferable to lower the acid concentration of the treating solution in order to keep as much as possible the structure of the gel formed in the step 1 which permits easy extraction of impurities.

In Process A, the acid concentration of the treating solution at the first stage of the treatment procedure is preferably adjusted to 30% by volume or less (which means that the amount of the acid contained per 100 parts by volume of the treating solution is 30 parts by volume or less: hereinafter the same applied).

When the acid concentration of treating solution is in the range of 30% by volume or less, the fibrous gel retain a swollen state and undergoes alkali elimination in this state. Moreover, the efficiency of extraction of impurities is greatly improved by the synergistic effect of the swollen state and the large surface area characteristic of fine hollow fiber.

When a treating solution having an acid concentration of more than 30% by volume is used at the first stage of the treatment procedure, the structure of silica produced by this treatment is too dense, so that extraction of impurities remaining in the inner part becomes difficult.

An acid concentration of the treating solution of less than 0.5% by volume is not practical from the viewpoint of the efficiency of the acid treatment.

For these reasons, the acid concentration of a treating solution used at the first stage of the treatment is suitably in the range of 0.5 to 30% by volume, preferably 1 to 25% by volume, more preferably 3 to 20% by volume.

In the case of the multistage treatment, the acid concentration of a treating solution at the first stage should be adjusted to 30% by volume or less, but the acid concentrations of treating solutions at the second and later stages do not have such a limit and can optionally be determined.

In Process B, the acid concentration of the treating solution is 4N or less, preferably 0.5 to 3N, more preferably 1 to 2N.

Although the treatment temperature in this step is not critical in both Process A and Process B, it is preferable to carry out the extraction procedure at a temperature of 50° C. or higher.

When the treatment is carried out under pressure at a temperature higher than the boiling point at atmospheric pressure of the treating solution, the time required for extracting impurities can be reduced. Although the temperature at the extraction under pressure is preferably as high as possible, it is in the range of 100° to 150° C., preferably 110° to 140° C. for practical use when corrosion of an apparatus by the acid and the energy cost are taken into consideration.

The treatment in this step is preferably carried out with stirring.

In Process A, the procedure in this step can be carried out also by continuously treating gel in the form of long fibers as it is, but in the case of batchwise treatment, it is preferable to cut the gel in the form of long fibers obtained in the above-mentioned step 1 into short fibers. For the cutting into short fibers, a conventional cutter for cutting glass fiber can be used. The length of the gel after the cutting is usually preferably 5 to 50 mm, and a length of about 10 mm is particularly suitable.

In Process B, the fibrous gel is easily made into short fibers of about 2 to about 5 mm in length by stirring in the treating solution.

When the gel is made into short fibers, its dispersibility due to stirring in the treating solution becomes very good. The gel in the form of short fibers disperses in the treating solution to form a slurry. Therefore, procedure of extracting impurities becomes easy and the uniformity of the impurities-extracting effect is improved, so that the scatter of the results of extracting impurities is greatly reduced. Further, since the gel in the form of short fibers has also high bulkiness characteristic of fibrous substances, liquid separation from the gel is very easy also in washing and filtration procedures after the extraction procedure of impurities.

The silica fiber obtained by the acid treatment is then deacidified and dehydrated by washing with water having an optional temperature, if necessary, combined with a filtration procedure.

As the acid used in this invention, there are preferably used those of high purity called purified grade or electronic grade, and as water used for diluting the starting material and the acid used or for washing silica, there is preferably used pure water containing almost no impurity.

In both Process A and Process B, the content of the above-mentioned impurities including radioactive elements in silica becomes very low by virtue of the treatment in the present step.

The contents of the impurities in silica after the acid treatment can be reduced to about 10 ppm or less for alkali metals, 3 ppm or less for chlorine, and about 3 ppb or less for uranium.

Next, Process A-2 and Process B-2 are explained below.

Process A-1 and Process B-1 described above are so-called wet processes and are disadvantageous in that the resulting silica is hygroscopic because of the presence of many silanol groups on its surface.

The present inventors have devoted themselves to research in order to remove such a problem and manufacture high purity silica having a very low content of impurities, a low hygroscopicity and a small specific surface area, efficiently and economically by using an aqueous alkali silicate solution as a starting material, and have accomplished this invention.

Process A-2 and Process B-2 are processes constructed by adding the third step (step 3) to Process A-1 or Process B-1, respectively, in order to reduce the hygroscopicity of the silica obtained by Process A-1 or Process B-1.

Embodiments of Process A-2 or Process B-2 comprise the following three steps.
Step 1: fiberization step
Step 2: impurities-extracting step
Step 1 and step 2 are as explained for each of Process A-1 and Process B-1.
Step 3: heat treatment step
In this step the fibrous silica obtained is heat-treated at a temperature of 1,000° C. or higher.

Process A-2 and Process B-2 have the following characteristic in addition to the same characteristics as those of Process A-1 or Process B-1, respectively.

When heat-treated at a temperature of 1,000° C. or higher, the silica obtained loses silanol groups present on its particle surface, and therefore the hygroscopicity of the silica can be greatly reduced, and the fine pores of silica particles are lost, so that there can be obtained dense silica particles having a small specific surface area and a high bulk density.

Process A-2 and Process B-2 constructed by combining the above-mentioned step 3 with Process A-1 or Process B-1, respectively, can improve the efficiency of extraction of impurities in silica and can give a silica having a low hygroscopicity and a high denseness.

The high purity silica obtained by the process of this invention is suitable also for applications in which the presence of particularly water therein is undesirable, for example, transparent vitreous silica, fillers for resin compositions for encapsulating electronic parts, etc.

Step 3: Heat treatment step

The fibrous gel is converted to silica by the acid treatment in step 2, but the silica still contains water. This water is divided into adhered water and bound water. The adhered water is easily evaporated by heating to 100° C. or higher, while the bound water is difficult to remove completely even at a temperature of 400° C. or higher.

This is because many silanol groups ($\equiv$Si-OH) are present on particle surface particularly in silica obtained by a wet process and bind to water in the atmosphere. For example, when the silica obtained by a wet process was heat-treated at 800° C. for 1 hour, water corresponding to about 7% of its (dry weight base) was evaporated, but the silanol groups remained as they were and adsorbed water in the atmosphere to cause rehydration. Therefore, when the heat-treated silica is allowed to stand in the atmosphere, it adsorbs water, and when allowed to stand therein for a long time, it returns to its original state.

In order to solve this problem, the present inventors have investigated the treatment conditions variously, and have consequently found that heat treatment at a temperature of 1,000° C. or higher of the silica obtained in the step 2 causes disappearance of its silanol groups unexpectedly and can give a dense silica having a small specific surface area.

This invention has been accomplished on the basis of this finding.

A rehydration tendency is weakened with elevation of the heat treatment temperature, and when the heat treatment is carried out at a temperature of 1,000° C. or higher, almost no rehydration tendency is observed.

When high purity silica is used, for example, in transparent vitreous silica, or as a filler for resin compositions for encapsulating electronic parts, the presence of particularly water therein is undesirable, and hence the heat-treatment at 1,000° C. or higher is an indispensable step.

When heat-treated at a temperature of 1,000° C. or higher, the silica obtained in the step 2 splits from numerous fine cracks present in the fiber to change to finely granulated silica, and at the same time, it loses fine pores to obtain a dense structure.

Thus, silica particles having a specific surface area of about 10 $m^2/g$ or less can be obtained.

Therefore, the silica after the heat treatment can be used as it is as silica particles, though if necessary, the particle size can be adjusted by further grinding the silica.

As to heat treatment conditions for obtaining silica particles having a low hygroscopicity, a high bulk density and a small specific surface area, the heating temperature is preferably 1,000° C. or higher, and in practical 1,100° to 1,400° C. The treatment time may be properly determined in relation to the predetermined temperature.

As an atmosphere for carrying out the heat treatment, oxygen and carbon dioxide gas may be used, and if necessary, inert gases such as nitrogen, argon and the like may be used. For practical use, air is preferred.

As an apparatus for carrying out the heat treatment, any apparatus may be used so long as it can maintain the silica at a temperature of 1,000° C. or higher, and there can be used a tubular furnace, box-type furnace, tunnel furnace, fluidized calcining furnace, etc. As to a heating method, electric heat, combustion gas and the like may be used.

EFFECTS OF THE INVENTION

According to Process A-1 or Process B-1 of this invention, high purity silica particles having a very low content of impurities including radioactive elements such as uranium can be obtained by using an aqueous alkali silicate solution as a starting material.

The silica particles obtained by these processes have a higher purity than do those obtained by prior art, and hence can be used not only as a filler, dispersant and the like but also as a material for transparent vitreous silica, special ceramics and the like. Moreover, they are expected to be used as a material for fillers for resin compositions for encapsulating electronic parts.

Further, according to Process A-2 or Process B-2 of this invention, silica particles of a particle size of 1 to 100 μm having such a high purity that their content of impurities including radioactive elements such as uranium is very low, a low hygroscopicity and a small specific surface area, can be obtained by using an aqueous alkali silicate solution as a starting material.

The silica particles obtained by these processes have a higher purity, a lower hygroscopicity and a denser structure than do those obtained by prior art, and hence can be used as a material for transparent vitreous silica special ceramics and the like, and particularly as a filler for resin compositions for encapsulating highly integrated circuits.

Further, these processes are advantageous also in that they can reduce the manufacturing cost as compared with conventional processes.

The process and effects of this invention is explained below with reference to Examples and Comparative Examples.

EXAMPLE A1

Under reduced pressure, 3,000 g of aqueous sodium silicate solution #3 (corresponding to JIS K1408 Sodium Silicate No. 3: hereinafter the same applied) ($SiO_2$: 28%, $Na_2O$: 9%, U: 36 ppb) was heated at 50° C. to be dehydrated and concentrated, whereby a starting solution for fiberization containing 32% $SiO_2$ was obtained. The starting solution had a viscosity of about 100 poise at 30° C. and was good also in stringiness. The starting solution was filtered, after which the filtrate was extruded into a coagulating bath (coagulant: DMAC) maintained at 30° C., at a speed of 3 m/min by means of an extruder through a nozzle coated with PTFE resin having a bore diameter of 0.1 mm$\phi$ and a number of bores of 200.

The starting solution extruded was dehydrated by DMAC to be coagulated into a transparent fibrous gel. The fibrous gel was cut with a cutter into short fibers having a fiber length of about 1 cm.

In 500 cc of a treating solution (a 5% by volume aqueous sulfuric acid solution) was immersed 10 g of the resulting gel in the form of short fibers, and treated with stirring at 100° C. for 1 hour. Subsequently, the treating solution was replaced by 500 cc of a 10% by volume aqueous sulfuric acid solution, and second-stage treatment was carried out in the same manner as described above.

The silica in the form of short fibers thus obtained was washed with boiling water and filtered to be deacidified and dehydrated, and the residue was predried at 150° C. and then heat-treated at 1,200° C. for 1 hour.

The silica in the form of short fibers was finely split into finely granulated silica by the heat treatment. In order to make the particle size distribution uniform, the finely granulated silica was ground by means of a grinder made of agate, whereby final silica particles were obtained.

EXAMPLE A2

5,000 Grams of aqueous sodium silicate solution #3 (in the same lot as in Example A1) was maintained at 30° C., and finely powdered sodium hydrogen sulfate was slowly added in small portions with stirring. The viscosity of the sodium silicate solution increased with an increase of the adding amount of sodium hydrogen sulfate, and a starting solution having a viscosity of 30 poise was obtained.

The starting solution had air sucked therein and was filled with air bubbles. The starting solution containing air bubbles was extruded as it was into a coagulating bath using DMAC as a coagulant from an extruder through a nozzle made of gold-platinum alloy having a bore diameter of 0.1 mm$\phi$ and a number of bores of 200, to obtain a fibrous gel. Many fine bubbles were present in the fibrous gel. The fibrous gel still containing bubbles was cut into short fibers and then subjected to the same treatment as in Example A1 to obtain silica particles.

In Table A1 are shown the impurity contents of the silicas before the heat treatment obtained in Examples A1 and A2 described above, and physical properties of the silica particles after the heat treatment.

Analysis for Cl, U and Th was conducted by radioactivation analysis.

In all Examples, guaranteed reagents manufactured by Nakarai Chemical Co., Ltd. were used as acids, and deionized water having an electrical conductivity of 1.0 μS/cm or less (25° C.) was used as water.

TABLE A1

(1) Impurity contents of silica before heat treatment

| | Impurity contents | | | | |
|---|---|---|---|---|---|
| | [ppm] | | | [ppb] | |
| Example | Na | K | Cl | U | Th |
| A1 | 0.9 | 0.4 | 1.2 | <1 | 4 |
| A2 | 0.5 | 0.4 | 1.4 | <1 | <1 |

(2) Physical properties of silica particles after heat treatment

| | Example | |
|---|---|---|
| Item observed | A1 | A2 |
| Particle size distribution (μm)*: | 1 to 100 (15) | 1 to 100 (15) |
| Bulk density (g/cm³): | 0.55 | 0.55 |

TABLE A1-continued

| Water absorption (%)** | 0.0 | 0.0 |
|---|---|---|

*The numbers in parentheses indicate weight average particle sizes.
**Each silica after heat treatment was allowed to stand in a thermo-hygrostat adjusted to 20° C. and 80% RH, and the weight change was measured. The weight change is shown as water absorption.
Water absorption (%) = $(W_1-W_0) \times 100/W_0$
$W_1$: The weight (g) of each sample after standing for 72 hours under the conditions of 20° C. and 80% RH.
$W_0$: The weight (g) of each sample allowed to cool to room temperature in a desiccator after the heat treatment.

Water absorption (%) = $(W_1 - W_0) \times 100/W_0$ $W_1$: The weight (g) of each sample after standing for 72 hours under the conditions of 20° C. and 80% RH.

$W_0$: The weight (g) of each sample allowed to cool to room temperature in a desiccator after the heat treatment.

EXAMPLE A3

5,000 Grams of aqueous sodium silicate solution #3 (in the same lot as in Example A1) was dehydrated and concentrated under reduced pressure by means of a vacuum pump with kneading in a kneader maintained at 50° C., so as to have a $SiO_2$ content of 31.8%, whereby a transparent starting solution was obtained. The viscosity of the starting solution was 50 poise at 30° C. The starting solution was extruded into each of various coagulants from an extruder through a nozzle coated with PTFE resin having a bore diameter of 0.1 mm$\phi$ and a number of bores of 50, to obtain a transparent fibrous gel. The fibrous gels thus obtained were treated in the same manner as in Example A1 to obtain the results shown in Table A2.

TABLE A2

(1) Impurity contents of silica before heat treatment

| | | Item | |
|---|---|---|---|
| | | Impurity contents | |
| No. | Coagulant | Na (ppm) | U (ppb) |
| A3-1 | DMF | 1.5 | <1 |
| A3-2 | Methanol | 1.2 | <1 |
| A3-3 | Ethanol | 2.3 | 2 |

(2) Physical properties of silica particles after heat treatment

| Weight average particle size: | 15 μm for all of Nos. A3-1 to 3 |
|---|---|
| Bulk density: | 0.55 g/cm³ for all of Nos. A3-1 to 3 |
| Water absorption: | 0.0% for all of Nos. A3-1 to 3 |

EXAMPLE A4 AND COMPARATIVE EXAMPLE A1

(1) 10 Grams of a gel in the form of short fibers obtained by the same procedure as in Example A1 was placed in 500 cc of each of first-stage treating solutions, i.e., aqueous sulfuric acid solutions having the acid concentration of 0.5, 10, 20 or 30% by volume and those having the acid concentration of 40 or 70% by volume for comparison. Thereafter, treatment for extraction of impurities according to Example A1 was carried out. (Examples A4-1 to 4 and Comparative Examples A1-1 to 2).

(2) The same treatment as in Comparative Example A1 was carried out, except for changing only the order of acid concentrations of the treating solution in the acid treatment. (Examples A4-5 to 6).

The impurity contents of the silicas thus obtained are shown in Table A3 together with the results of Example A1.

TABLE A3

Effect of acid concentration (sulfuric acid) of treating solution

| | | Item | | | |
|---|---|---|---|---|---|
| | | Acid concentration* | | Impurity contents | |
| | No. | First stage | Second stage | Na (ppm) | U (ppb) |
| Example | A4-1 | 0.5 | 10 | 9.5 | 3.0 |
| | A1 | 5 | 10 | 0.9 | <1 |
| | A4-2 | 10 | 10 | 2.3 | 1.5 |
| | A4-3 | 20 | 10 | 8.2 | 2.5 |
| | A4-4 | 30 | 10 | 9.0 | 2.8 |
| Comparative Example | A1-1 | 40 | 10 | 40 | 50 |
| | A1-2 | 70 | 10 | 339 | 110 |
| Example | A4-5 | 10 | 40 | 2.5 | 1.7 |
| | A4-6 | 10 | 70 | 3.4 | 1.8 |

*Acid concentration: % by volume, (cc conc. sulfuric acid/100 cc treating solution)
Common conditions of acid treatment: Temperature 100° C. Treatment time 1 hr.

EXAMPLE A5 AND COMPARATIVE EXAMPLE A2

A gel in the form of short fibers was obtained by the same procedure as in Example A1, except for use of the starting solution prepared in Example A3. 10 Grams of the gel in the form of short fibers was placed in 500 cc of each of first-stage treating solutions, i.e., aqueous nitric acid solutions having the acid concentration of 5, 10 or 20% by volume and those having the acid concentration of 40 or 60% by volume for comparison, and treated with stirring at 100° C. for 1 hour. Subsequently, each treating solution was replaced by 500 cc of a 10% by volume aqueous nitric acid solution, and second-stage treatment was carried out in the same manner as described above. Subsequent treatment was carried out by a method according to Example A1 to obtain silica particles.

The impurity contents of the silicas before the heat treatment and physical properties of the silica particles after the heat treatment are shown in Table A4.

TABLE A4

Effect of acid concentration (nitric acid) of treating solution (1) Impurity contents of silica before heat treatment

| | | Item | | | |
|---|---|---|---|---|---|
| | | Acid concentration* | | Impurity contents | |
| | No. | First stage | Second stage | Na (ppm) | U (ppb) |
| Example | A5-1 | 5 | 10 | 2.8 | <1 |
| | A5-2 | 10 | 10 | 5.2 | <1 |
| | A5-3 | 20 | 10 | 9.3 | <1 |
| Comparative Example | A2-1 | 40 | 10 | 50 | 7 |
| | A2-2 | 60 | 10 | 235 | 20 |

*Acid concentration: % by volume, (cc conc. nitric acid/100 cc treating solution)

(2) Physical properties of silica particles after heat treatment

| Weight average particle size: | 15 μm for all of Nos. A5-1 to 3 |
|---|---|
| Bulk density: | 0.55 g/cm³ for all of Nos. A5-1 to 3 |
| Water absorption: | 0.0% for all of Nos. A5-1 to 3 |

EXAMPLE A6 AND COMPARATIVE EXAMPLE A3

6,000 Grams of aqueous sodium silicate solution #3 (in the same lot as in Example A1) was dehydrated and concentrated under reduced pressure by means of a vacuum pump with kneading in a kneader maintained at 70° C., whereby starting solutions various in their viscosities were obtained.

These starting solutions were individually fiberized by a procedure according to Example A1. The states of the individual fiberizations are shown in Table A5.

The fibrous gels thus obtained were treated by a method according to Example A1. The results of the extraction of impurities are shown in Table A5 in terms of the Na content of each silica before the heat treatment as a representative.

TABLE A5

Impurity content of silica before heat treatment

| | No. | Viscosity of starting solution* (poise) | State of fiberization | Impurity content Na, (ppm) |
|---|---|---|---|---|
| Example | A6-1 | 2 | No mutual adhesion of fibers. Stable fiberization was possible. | 4.0 |
| | A6-2 | 10 | | 1.5 |
| | A6-3 | 50 | | 1.2 |
| | A6-4 | 100 | | 0.9 |
| | A6-5 | 200 | | 1.1 |
| | A6-6 | 500 | | 3.0 |
| Comparative Example | A3-1 | 1.0 | Many adhered fibers. | 120 |
| | A3-2 | 1000 | Stable fiber formation was impossible. | — |

*Values at 30° C.

EXAMPLE B1

6,000 Grams of aqueous sodium silicate solution #3 (corresponding to JIS K1408 Sodium Silicate No. 3: hereinafter the same applied) ($SiO_2$ 28%, $Na_2O$: 0.9%, U: 36 ppb) was heated at 50° C. under reduced pressure to be dehydrated and concentrated, whereby a starting solution for fiberization containing 32% $SiO_2$ was obtained. The starting solution had a viscosity of about 100 poise at 30° C. and was good also in stringiness.

The starting solution was filtered, after which the filtrate was extruded into 20 liters of a coagulating bath (a 1N aqueous sulfuric acid solution) maintained at 30° C., at a speed of 6 m/min by means of an extruder through a nozzle made of gold-platinum alloy having a bore diameter of 0.1 mm$\phi$ and a number of bores of 200. The starting solution extruded was coagulated therein by neutralization of $Na_2O$ to be converted into a transparent fibrous gel. The fibrous gel had a hollow structure and a twisted shape having an alternation of thick portions and thin portions, and its surface portion had numerous scale-like cracks.

The fibrous gel was taken out of the coagulating bath by means of a belt conveyor. The speed of the belt conveyor was 1 m/min, and the immersion time of the fibrous gel in the coagulating bath was about 1 minute.

In 500 cc of a treating solution (a 1N aqueous sulfuric acid solution) was immersed 40 g of the fibrous gel obtained, and treated with stirring at 100° C. for 3 hours. The fibrous gel was finely split into short fibers of 2 to 5 mm in length by this treatment.

Subsequently, the silica in the form of short fibers thus obtained was placed in 500 cc of water, and after stirring for 10 minutes, the silica was dehydrated by using a Buchner funnel. The sulfuric acid radical ($SO_4^{2-}$) concentration in the silica after five repetitions of washing with water was 1 ppm or less.

The silica obtained was dried overnight at 150° C., and then heat-treated at 1,200° C. for 1 hour.

The silica in the form of short fibers was finely split into finely granulated silica by the heat treatment. In order to make the particle size distribution uniform, the finely granulated silica was ground by means of a grinder made of agate, whereby final silica particles were obtained.

The impurity contents of the silica obtained and physical properties of the silica particles are shown in Table B1.

TABLE B1

(1) Impurity contents of silica

| | Item Impurity contents | | | | |
|---|---|---|---|---|---|
| | [ppm] | | | [ppb] | |
| | Na | K | Cl | U | Th |
| Silica before heat treatment | 0.6 | 0.3 | 1.2 | <1 | <1 |
| Silica after heat treatment | 0.7 | 0.3 | 0.4 | <1 | <1 |

(2) Physical properties of silica particles after heat treatment

| Particle size* distribution [μm] | Bulk density [g/cm$^3$] | Water** absorption [%] |
|---|---|---|
| 1 to 100 (15) | 0.55 | 0.02 |

*The number in parentheses indicates a weight average particle size.
**According to Example A1.

EXAMPLE B2 AND COMPARATIVE EXAMPLE B1

5,000 Grams of aqueous sodium silicate solution #3 (in the same lot as in Example B1) was dehydrated and concentrated under reduced pressure by means of a vacuum pump with kneading in a kneader maintained at 50° C., so as to have a $SiO_2$ content of 31.8%, whereby a transparent starting solution was obtained. The viscosity of the starting solution was 50 poise at 30° C.

The starting solution was extruded into 20 liters of each of aqueous sulfuric acid solutions various in their concentrations from an extruder through a Teflon ®-coated nozzle made of SUS-316 having a bore diameter of 0.2 mm$\phi$ and a number of bores of 50, whereby fibrous gels were obtained. All the fibrous gels were transparent. (®=registered trademark for a PTFE resin of Du Pont).

These fibrous gels were individually treated in the same manner as in Example B1 to obtain the results shown in Table B2.

When a nozzle made of SUS-316 which had not been coated with Teflon ® (Trademark for a PTFE resin of Du Pont) was used, the starting solution was apt to adhere to the nozzle, only a dumpling like gel was obtained, and it was difficult to obtain a fibrous gel.

TABLE B2

(1) Impurity contents of silica before heat treatment

| | Item | | |
|---|---|---|---|
| | Sulfuric acid concentration of acid solution as coagulating bath | Impurity contents | |
| No. | (N) | Na (ppm) | U (ppb) |
| Example B2-1 | 0.1 | 9.5 | 2.8 |
| Example B2-2 | 0.5 | 4.0 | 2.0 |
| Example B2-3 | 1.0 | 0.6 | <1 |

TABLE B2-continued

| | | | |
|---|---|---|---|
| Example B2-4 | 2.0 | 0.8 | <1 |
| Example B2-5 | 4.0 | 3.0 | 2.0 |
| Comparative Example B1-1 | 8.0 | 60 | 80 |
| Comparative Example B1-2 | 16.0 | 120 | 100 |

(2) Physical properties of silica particles after heat treatment

| | |
|---|---|
| Weight average particle size: | 15 μm for all of Examples B2-1 to 5 |
| Bulk density: | 0.55 g/cm$^3$ for all of Examples B2-1 to 5 |
| Water absorption: | 0.02% for all of Examples B2-1 to 5 |

EXAMPLE B3 AND COMPARATIVE EXAMPLE B2

The starting solution prepared in Example B2 was extruded into 20 liters of a 2N aqueous sulfuric acid solution from an extruder through each of Teflon-coated nozzles made of SUS-316 having a bore diameter of 0.2, 0.5 or 1.0 mmφ and a number of bores of 50, and that having a bore diameter of 3.0 mmφ and a number of bores of 50 for comparison, whereby fibrous gels were obtained.

The fibrous gels obtained were treated in the same manner as in Example B1. The results of the extraction of impurities are shown in Table B3 in terms of the Na content of each silica before the heat treatment as a representative.

TABLE B3

Impurity content of silica before heat treatment

| | Item | |
|---|---|---|
| No. | Bore diameter of nozzle, [mmφ] | Impurity content Na, [ppm] |
| Example B3-1 | 0.2 | 0.8 |
| Example B3-2 | 0.5 | 1.0 |
| Example B3-3 | 1.0 | 8.0 |
| Comparative Example B2-1 | 3.0 | 100 |

Among the fibrous gels, all of those shown in Example B3 were transparent, but the gel obtained in Comparative Example B2-1 was devitrified and white and its silica content was different in different portions and uneven.

EXAMPLE B4 AND COMPARATIVE EXAMPLE B3

6,000 Grams of aqueous sodium silicate solution #3 (in the same lot as in Example B1) was dehydrated and concentrated under reduced pressure by means of a vacuum pump with kneading in a kneader maintained at 70° C., whereby starting solutions various in their viscosities were obtained.

These starting solutions were individually fiberized by the procedure according to Example B1. The states of the individual fiberizations are shown in Table B4.

The fibrous gels thus obtained were treated by a method according to Example B1. The results of the extraction of impurities are shown in Table B4 in terms of the Na content of each silica before heat treatment as a representative.

TABLE B4

Impurity content of silica before heat treatment

| | | Item | | |
|---|---|---|---|---|
| | No. | Viscosity of starting solution* (poise) | State of fiberization | Impurity content Na, (ppm) |
| Example | B4-1 | 2 | No mutual adhesion of fibers. Stable fiberization was possible. | 2.0 |
| | B4-2 | 10 | | 1.0 |
| | B4-3 | 50 | | 0.6 |
| | B4-4 | 100 | | 0.6 |
| | B4-5 | 200 | | 1.5 |
| Comparative Example | B3-1 | 1.0 | Many adhered fibers. | 50 |
| | B3-2 | 1000 | Stable fiberization was impossible. | — |

*Values at 30° C.

EXAMPLE B5

The starting solution prepared in Example B1 was extruded into 20 liters of a 1N aqueous nitric acid solution by a procedure according to Example B1 to obtain a fibrous gel.

When 40 g of the fibrous gel obtained was placed in 500 cc of a 1N aqueous nitric acid solution and treated with stirring at 100° C. for 3 hours, it became a silica in the form of short fibers having a length of 2 to 5 mm. Subsequent treatment was carried out by a method according to Example B1 to obtain silica particles.

The impurity contents of the silica before the heat treatment were as follows:
Na: 1.0 ppm
U: 2.1 ppb.

Physical properties of the silica particles after the heat treatment were as follows:
Weight average particle size: 15 μm
Bulk density: 0.55 g/cm$^3$
Water absorption: 0.02%

EXAMPLE A7 AND COMPARATIVE EXAMPLE A4

The silica after extraction of impurities and washing with water obtained in Example A1 was dried at 105° C. for 4 hours.

Six 10.00-g portions of the dried silica were weighed out and heat-treated for 1 hour at a temperature of 400, 600, 800, 900, 1000 or 1200° C., respectively.

Each sample after the heat-treatment was allowed to cool to room temperature in a desiccator, after which its weight ($W_0$) was measured. Then, each sample was allowed to stand in a thermo-hygrostat adjusted to 20° C. and 80% RH, and the change of the weight with the lapse of time was measured.

The measurement results were as shown in Table A6. The samples heat-treated at 1,000° C. or higher underwent no weight change, but when the treatment temperature was 400° to 900° C., the silica particles adsorbed moisture in the air and increased in weight with the lapse of time.

The same results as in the present example were obtained also for the dried silicas obtained in Examples other than the present example after these silicas were heat-treated at 1,000° C. or higher, and no moisture absorption due to exposure to the atmosphere was observed for them after the heat treatment.

TABLE A6

| No. | Heat treatment temperature [°C.] | Time elapsed (hrs.) and weight (g) of heat-treated sample* | | | | | |
|---|---|---|---|---|---|---|---|
| | | ($W_0$) | $2^H$ | $4^H$ | $6^H$ | $24^H$ | $48^H$ |
| Comparative Example A4-1 | 400 | 9.55 | 9.61 | 9.68 | 9.77 | 9.81 | 10.00 |
| Comparative Example A4-2 | 600 | 9.42 | 9.42 | 9.43 | 9.45 | 9.54 | 9.70 |
| Comparative Example A4-3 | 800 | 9.26 | 9.28 | 9.30 | 9.32 | 9.45 | 9.60 |
| Comparative Example A4-4 | 900 | 9.24 | 9.24 | 9.26 | 9.27 | 9.38 | 9.50 |
| Example A7-1 | 1000 | 9.20 | 9.20 | 9.20 | 9.20 | 9.20 | 9.20 |
| Example A7-2 | 1200 | 9.20 | 9.20 | 9.20 | 9.20 | 9.20 | 9.20 |

*In a thermo-hygrostat adjusted to 20° C. and 80% RH.

What is claimed is:

1. A process for manufacturing high purity silica having an alkali metal content of 0 to 10 ppm, a chlorine content of 0 to 3 ppm and a uranium content of 0 to 3 ppb, said process comprising:
   (1) a step of extruding an aqueous solution of an alkali silicate represented by the general formula:

$M_2O \cdot nSiO_2$ 

wherein M is an alkali metal element and n is a number of moles of $SiO_2$ of 0.5 to 5, into a coagulating bath comprising a coagulant through a spinning nozzle having a bore diameter of 1 mm or less to coagulate the same, and thereby making the same into a fibrous gel, said aqueous solution having a viscosity in the range of 2 to 500 poise, and
   (2) a step of treating the fibrous gel obtained with an acid-containing solution, and then washing the same with water to extract and remove impurities.

2. A process according to claim 1, wherein the temperature at the acid treatment of the fibrous gel is 50° C. or higher.

3. A process according to claim 1, which comprises further a step of heating the resulting silica at a temperature of 1,000° C. or higher.

4. A process according to claim 3, wherein the temperature of the heating ranges from 1,000° to 1,400° C.

5. A process according to claim 1, wherein the bore diameter of the spinning nozzle ranges from 0.05 to 1.0 mm.

6. A process according to claim 1, wherein the bore diameter of the spinning nozzle ranges from 0.1 to 0.3 mm.

7. A process according to claim 1, wherein the spinning nozzle is a nozzle made of a noble metal alloy or a TFE resin, or a nozzle coated on the nozzle surface with a TFE resin.

8. A process according to claim 7, wherein the noble metal alloy is gold-platinum alloy.

9. A process according to claim 1, wherein the fibrous gel contains bubbles.

10. A process according to claim 1, wherein the coagulant is a water soluble organic medium, and the acid treatment of the fibrous gel is carried out by using first a treating solution having an acid concentration of 30% by volume or less.

11. A process according to claim 10, which comprises further a step of heating the resulting silica at a temperature of 1,000° C. or higher.

12. A process according to claim 10, wherein the water-soluble organic medium is at least one member selected from the group consisting of alcohols, esters, ketones, amides, and dimethylsulfoxide.

13. A process according to claim 10, wherein the acid concentration of the treating solution ranges from 0.5 to 30% by volume.

14. A process according to claim 10, wherein the acid concentration of the treating solution ranges from 1 to 25% by volume.

15. A process according to claim 10, wherein the acid concentration of the treating solution ranges from 3 to 20% by volume.

16. A process according to claim 10, wherein the acid treatment of the fibrous gel is carried out in at least two stages.

17. A process according to claim 10, which uses an aqueous alkali silicate solution having a viscosity in the range of 10 to 200 poise.

18. A process according to claim 1, wherein the coagulant is an acid solution having an acid concentration of 4N or less, and the acid treatment of the fibrous gel is carried out by using a treating solution having an acid concentration of 4N or less.

19. A process according to claim 18, which comprises further a step of heating the resulting silica at a temperature of 1,000° C. or higher.

20. A process according to claim 18, wherein the acid concentration of the acid solution ranges from 0.1 to 4N.

21. A process according to claim 18, wherein the acid concentration of the acid solution ranges from 0.5 to 3N.

22. A process according to claim 18, wherein the acid concentration of the acid solution ranges from 1 to 2N.

23. A process according to claim 18, wherein the acid concentration of the treating solution ranges from 0.5 to 3N.

24. A process according to claim 18, wherein the acid concentration of the treating solution ranges from 1 to 2N.

25. A process according to claim 18, wherein the acid treatment of the fibrous gel is carried out in at least two stages.

26. A process according to claim 18, which uses an aqueous alkali silicate solution having a viscosity in the range of 2 to 200 poise.

27. A process according to claim 18, which uses an aqueous alkali silicate solution having a viscosity in the range of 10 to 100 poise.

* * * * *